(12) United States Patent
Kuykendall

(10) Patent No.: US 6,675,422 B1
(45) Date of Patent: Jan. 13, 2004

(54) RAMP FOR TRAVERSING INCLINED CURB

(76) Inventor: Christopher D. Kuykendall, 8293 S. Reed St., Littleton, CO (US) 80128

( * ) Notice: Subject to any disclaimer, the term of this patent is extended or adjusted under 35 U.S.C. 154(b) by 0 days.

(21) Appl. No.: 10/288,066

(22) Filed: Nov. 5, 2002

(51) Int. Cl.⁷ .............................. E01C 11/22; E01D 1/00
(52) U.S. Cl. ................................ 14/69.5; 404/2; 404/7
(58) Field of Search ............................. 14/69.5, 71.1, 14/71.5; D34/32; 254/88; 404/6, 7, 9, 17, 19, 2

(56) References Cited

U.S. PATENT DOCUMENTS

| | | | |
|---|---|---|---|
| 2,759,207 A | * 8/1956 | Pennington | 14/69.5 |
| 3,546,773 A | * 12/1970 | Gerstin | 29/433 |
| 3,818,528 A | * 6/1974 | Petersen | 14/69.5 |
| 3,984,891 A | 10/1976 | Weinmann | |
| 4,050,403 A | * 9/1977 | Miller | 254/88 |
| 4,368,553 A | 1/1983 | Perry | |
| 4,443,905 A | * 4/1984 | Kopp | 14/69.5 |
| 4,986,405 | * 1/1991 | Alten | 193/38 |
| D346,256 | 4/1994 | Thomas, III et al. | |
| 5,341,533 | 8/1994 | Seitz | |
| 5,446,937 | * 9/1995 | Haskins | 14/69.5 |
| 5,836,028 | * 11/1998 | Petersen | 14/2.4 |
| 5,863,026 | * 1/1999 | Gano et al. | 254/88 |
| 5,901,395 | 5/1999 | Vander Heiden et al. | |
| 5,946,756 | 9/1999 | Mapp | |
| 6,044,511 | 4/2000 | Frost et al. | |
| 6,269,508 | * 8/2001 | Younce | 14/69.5 |

FOREIGN PATENT DOCUMENTS

DE    20012041 U  * 12/2000  ........... E01C/11/22

* cited by examiner

*Primary Examiner*—Robert E. Pezzuto
*Assistant Examiner*—Alexandra K. Pechhold
(74) *Attorney, Agent, or Firm*—Dale J. Ream

(57) ABSTRACT

A ramp enabling vehicles to smoothly traverse a steeply inclined curb situated between a street and a driveway includes an elongate planar ramp surface having upper and lower edges. The ramp includes a base portion integrally connected to an underside of the ramp surface. The base portion includes a curb contact surface adjacent the ramp surface upper edge which includes a configuration complementary to that of the inclined curb wall. The base portion includes a street contact surface adjacent the ramp surface rear edge. The base portion includes a support member intermediate the contact surfaces and spaced apart therefrom to define at least one longitudinally extending drainage channel. When placed adjacent a curb having an inclined wall, the ramp rests in planar contact with both the street and inclined curb wall with the ramp surface extending at an inclined configuration therebetween.

3 Claims, 5 Drawing Sheets

RAMP FOR TRAVERSING INCLINED CURB

BACKGROUND OF THE INVENTION

This invention relates generally to ramps and, more particularly, to a ramp for traversing a curb of the type having a steeply inclined planar wall between a street and a driveway.

The speed and efficiency of new street and home construction often results in a lack of curb cuts that would otherwise provide a smooth transition between a street and driveway. In other words, curbs having a steep incline are left in place even after a concrete to driveway is laid from the edge of the curb to a garage. Of course, such curb construction may also be left in place for efficient water drainage along the street. Such a steep incline between the street and driveway, however, is undesirable to anyone attempting to pull in or back out of the driveway. This curb configuration results in a very uncomfortable jolt and may even scrape or damage the undercarriage or spoiler of a low profile automobile. Although various ramp constructions have been proposed in the art, the existing devices do not provide for the smooth traversal of an inclined curb between a street and driveway.

Therefore, it would be desirable to have a ramp which may be positioned at the junction between a street and an inclined wall of a curb and which has a planar inclined surface extending between the street and a driveway. Further, it is desirable to have a ramp that is durable and capable of supporting the weight of a vehicle traveling thereon. In addition, it is desirable to have a ramp that does not impede the downstream flow of water along a curb.

SUMMARY OF THE INVENTION

A ramp which allows a vehicle to traverse a curb having an inclined wall between a street and a driveway includes an elongate planar ramp surface with an elongate base member integrally connected to an underside of the ramp surface. The ramp surface includes upper and lower longitudinal edges with opposed side edges extending laterally between ends of the longitudinal edges. The base member includes end walls depending from respective side edges. The base member further includes a curb contact surface adjacent the upper edge of the ramp surface and which extends longitudinally between the end walls. The curb contact surface is configured for substantially planar contact with the inclined wall of the curb when the ramp is positioned adjacent thereto. The base member further includes a street contact surface adjacent the lower edge of the ramp surface and which extends longitudinally between the end walls. The street contact surface includes a configuration for resting in a planar relationship with a street. A support member is integrally connected to the base member and is situated in between the contact surfaces for substantially nesting at a junction between the street and inclined curb wall for supporting a load force on the ramp surface. The support member is spaced apart from the contact surfaces so as to form drainage channels therebetween.

Therefore, a general object of this invention is to provide a ramp for enabling a wheeled vehicle to traverse a steeply inclined wall of a curb that extends between a street and a driveway.

Another object of this invention is to provide a ramp, as aforesaid, which may be positioned adjacent a curb without impeding a downstream flow of water.

Still another object of this invention is to provide a ramp, as aforesaid, which is durable and capable of supporting the weight load of an automobile.

A further object of this invention is to provide a ramp, as aforesaid, which may include modular sections for easy movement, positioning, and storage.

A still further object of this invention is to provide a ramp, as aforesaid, which may include carbon filler for inhibiting theft thereof.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 2b is a fragmentary view on an enlarged scale of an end wall of the ramp as in FIG. 2a;

DESCRIPTION OF THE PREFERRED EMBODIMENT

A ramp 10 for traversing a steeply inclined wall of a curb between a street and a driveway will now be described in detail with reference to FIGS. 1 through 5 of the accompanying drawings. The ramp 10 includes a ramp surface 12 integrally situated atop a base member 22.

Figure 1:
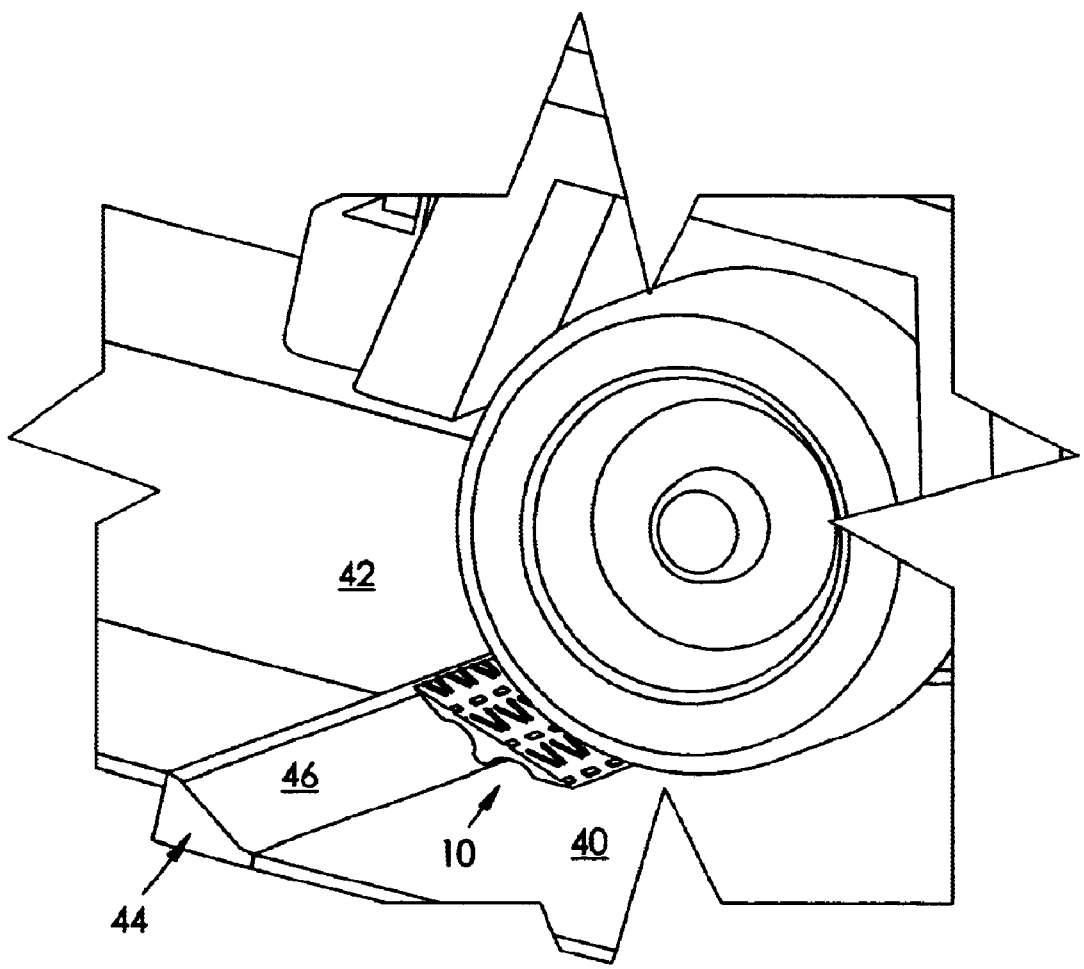
FIG. 1 is a fragmentary perspective view of a ramp according to one embodiment of the present invention in use adjacent a curb and being traversed by a wheeled vehicle.
Figure 2A:
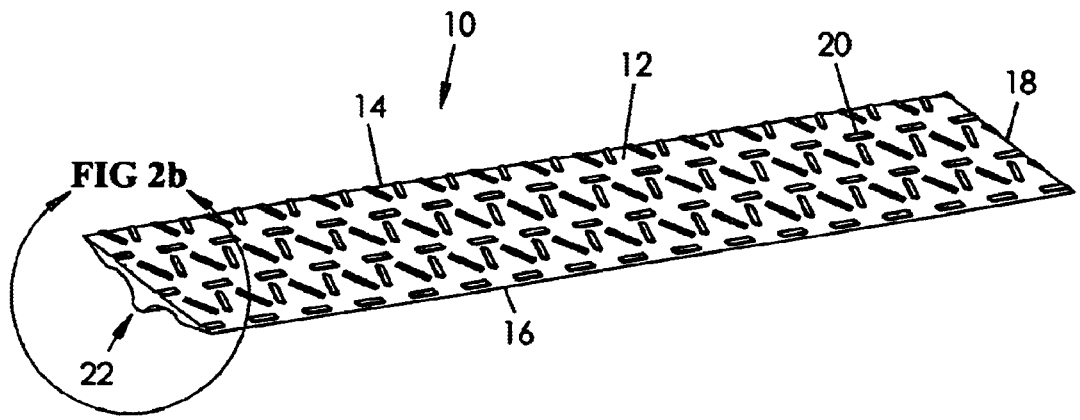
FIG. 2a is a complete perspective view of the ramp as in FIG. 1.
Figure 2B:
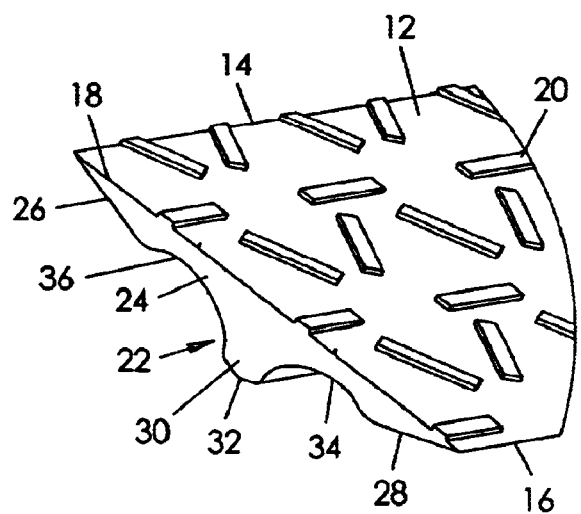

More particularly, the ramp surface 12 is an elongate planar surface having a generally rectangular configuration (FIG. 2a) although a slightly annular configuration for use with curved or dead end street configurations would also be suitable. The ramp surface 12 includes generally parallel upper 14 and lower 16 edges with side edges 18 extending between corresponding ends of the upper and lower edges. Although the ramp surface 12 is generally a flat, planar surface so as to provide a smooth transition between a street and an elevated driveway as to be further described below, a plurality of raised treads 20 may be integrally formed in the ramp surface 12 (FIGS. 2a and 2b). Obviously, a tread overlay may be adhered to the ramp surface 12 as a suitable alternative to an integral construction, if desired. Having a tread or other non-skid surface provides enhanced traction for the wheels of a vehicle traversing a curb via the ramp 10 (FIG. 1).

Figure 5:
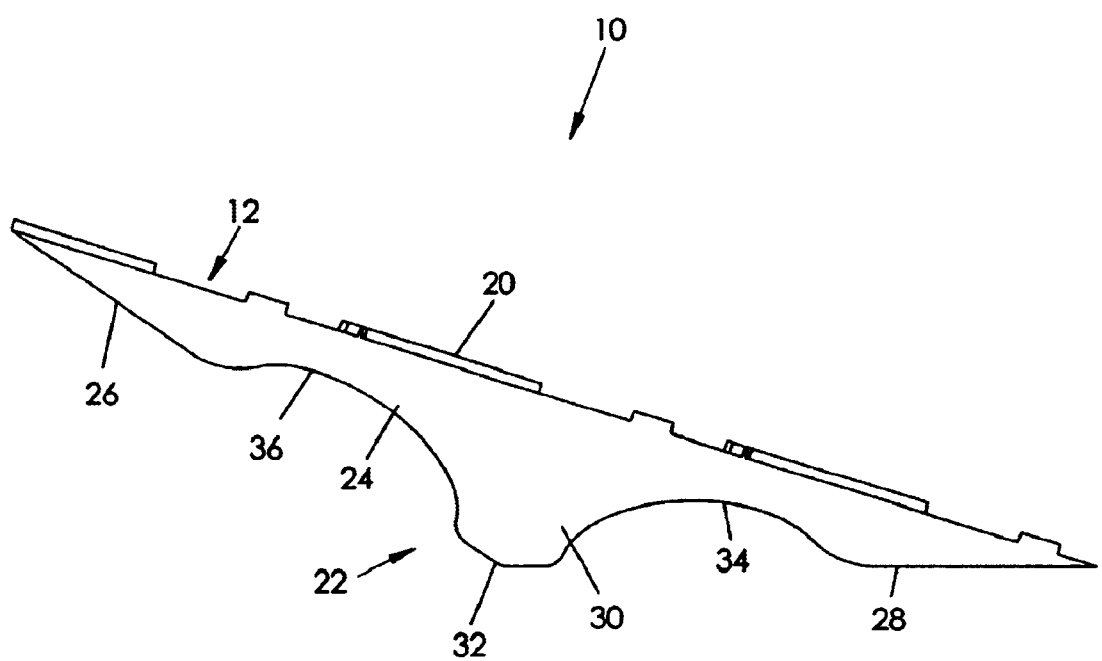
FIG. 5 is a side view of the ramp as in FIG. 2b.

The base member 22 also includes an elongate configuration that generally corresponds to the configuration of the ramp surface 12. Preferably, the base member 22 and ramp surface 12 are integrally connected although having a separated construction and then being coupled together would also work. More particularly, the base member 22 includes opposed end walls 24 extending downwardly from the side edges 18 of the ramp surface 12 (FIG. 5). Although integrally connected, the base member 22 includes three generally spaced apart portions. The base member 22 includes a curb contact surface 26 The curb contact surface 26 extends downwardly from the upper edge 14 toward the lower edge 16 and has an angular relationship relative to the ramp surface 12 (FIG. 5). Therefore, the curb contact surface 26 is configured for planar contact with the inclined wall 46 of a curb 44 as to be described in more detail later.

The base member 22 further includes a street contact surface 28 that is adjacent the lower edge 16 of the ramp surface 12 and which extends longitudinally therealong between the end walls 24. The street contact surface 28 extends at an angle relative to the ramp surface 12 but which is suitable for planar contact with the surface of a street (FIG. 5). The base member 22 integrally includes a support member 30 situated intermediate the curb contact surface 26 and street contact surface 28 (FIG. 5). The support member 30 is spaced apart from the contact surfaces 26, 28 as the contact surfaces 26, 28 do not extend completely from the corresponding longitudinal edge 14, 16 to the support member 30. The support member 30 includes a tip 32 having a generally V-shaped configuration that is generally complementary to a configuration of a junction between a street and an inclined curb wall 46. Therefore, when the ramp 10 is positioned adjacent a curb 44 having an inclined wall 46 extending between a street 40 and a driveway 42, the street contact surface 28 rests flat against the street, the curb contact surface 26 rests flat against the inclined wall 46, and the support member 30 nests securely at the street/inclined wall junction so as to support the ramp surface 12.

The base member 22 defines a first drainage channel 34 between the street contact surface 28 and the support member 30, the first drainage channel extending longitudinally therealong. The base member 22 may also define a second drainage channel 36 between the curb contact surface 26 and the support member 30, the second drainage channel extending longitudinally therealong. It should be appreciated that each drainage channel 34, 36 presents a generally concave configuration which allows the base member 22 to flatten out somewhat under the weight load of a vehicle without breaking or damaging the base member 22.

Preferably, the entire ramp 10 is integrally constructed of acrylonitrile, butadiene, and styrene ("ABS") plastic so as to have chemical resistance, heat stability, and impact strength. Therefore, the ramp 10, being constructed of ABS plastic, would exhibit an amount of flexion when a load force is applied thereto. However, the ramp may alternatively be constructed of nylon or polyurethane structural foam, both materials having strong rigidity but with less flexibility under a weight load. It is understood that a preselected amount of a carbon filler may be added to the ABS plastic material at the point of manufacture in order to add weight to the end product. Adding weight to the ramp 10 enables the ramp 10 to maintain its position in use and to inhibit easy theft of the product.

Figure 3:
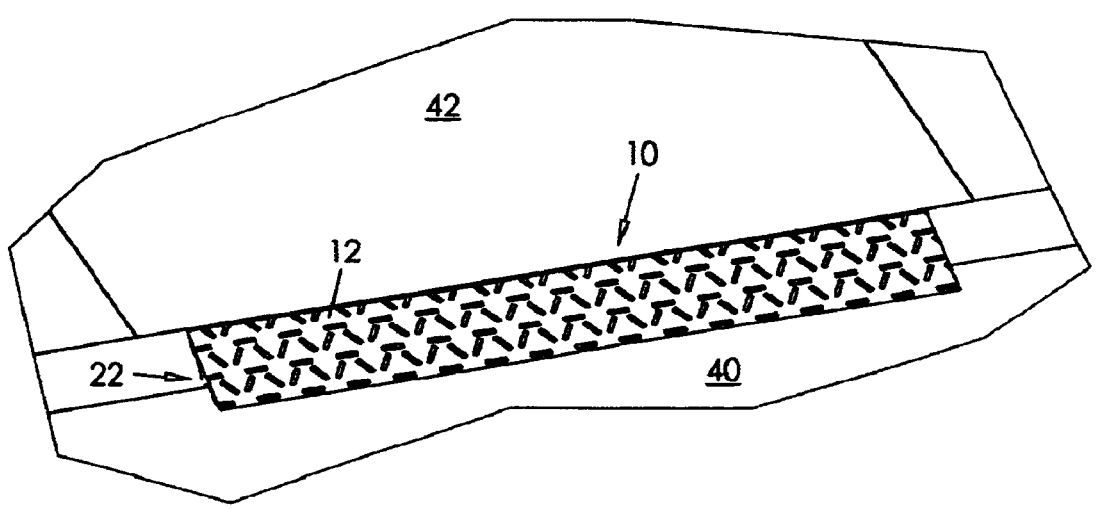
FIG. 3 is an elevated perspective view of the ramp as in FIG. 2a in position on a curb between a street and driveway.

In use, a user may position the ramp 10 adjacent a curb 44 having an inclined wall 46 extending between a street surface 40 and a driveway 42. When so positioned, the street contact surface 28 lays flat against the street 40, the curb contact surface 26 rests flat against the inclined wall 46, and the support member 30 nests securely at the street/inclined wall junction so as to support the ramp surface 12 (FIG. 1). In this position, the ramp surface 12 provides a planar surface extending between the street 40 and the driveway 42 (FIG. 3). Thus, the wheels of a vehicle, such as an automobile or bicycle, may traverse the inclined wall 46 of the curb 44 smoothly and without damage to the vehicle (FIG. 1). In addition, the drainage channels 34, 36 allow water to flow along the curb 44 without interruption.

Figure 4:
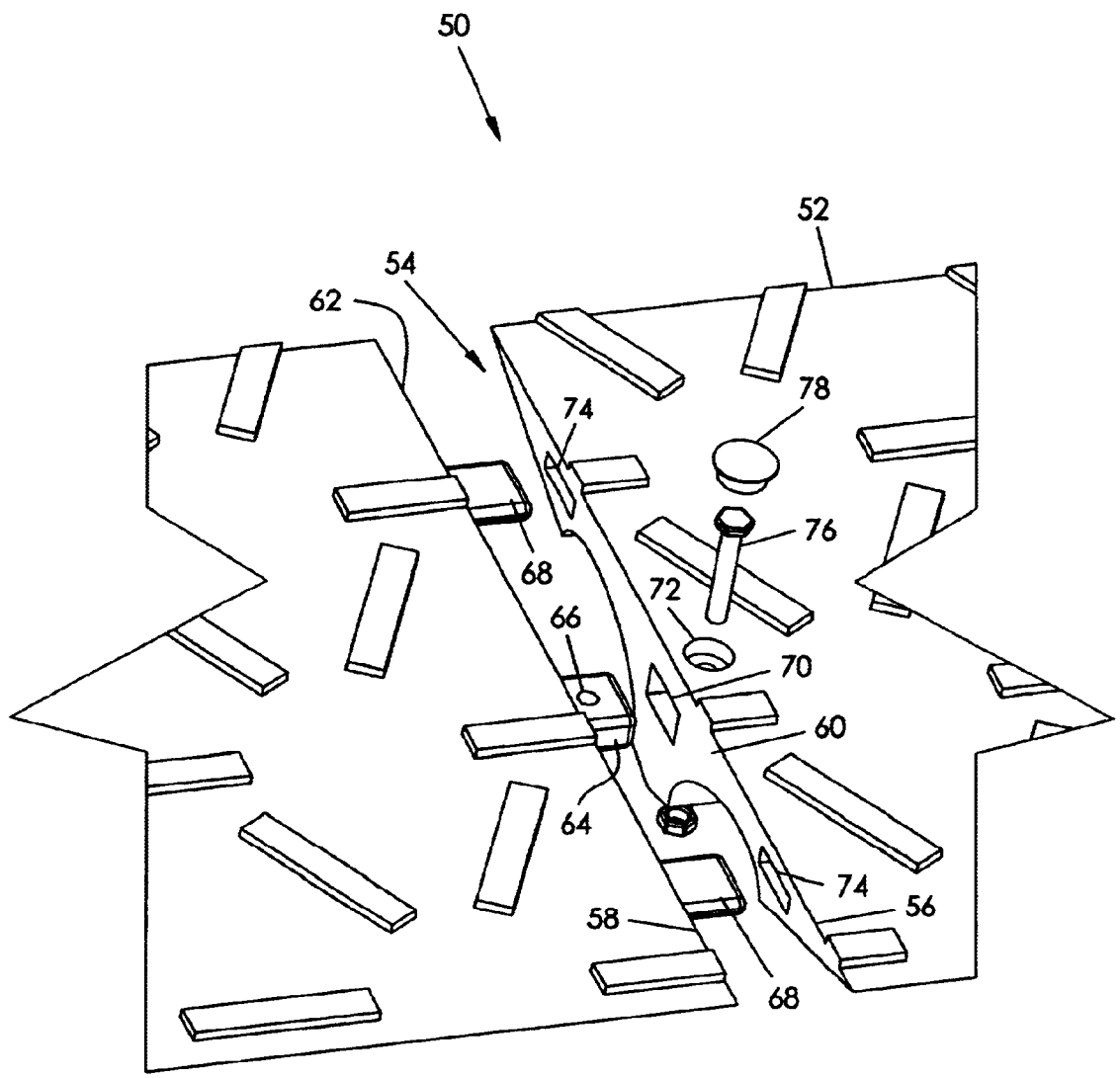
FIG. 4 is an exploded view of a ramp according to another embodiment of the present invention.

A ramp 50 according to another embodiment is shown in FIG. 4 and includes a construction that is substantially similar to that previously described except as specifically noted below. In this embodiment, more than one ramp may be laterally coupled together both to facilitate ramp coverage of driveways having different widths and for ease of installation or storage. More particularly, this embodiment may include a plurality of ramp surfaces 52 and corresponding integrally connected base members 54. Each ramp surface 52 includes first 56 and second 58 side edges and each base member 54 includes corresponding first 60 and second 62 end walls depending from respective side edges.

At least one primary flange 64 is mounted to the second end wall 62 of each base member 54, the primary flange defining a vertically positioned hole 66 therethrough (FIG. 4). Of course, additional flanges 68 may also be mounted to the second wall 62. The first end wall 60 of each base member 54 defines a primary slot 70 having a configuration complementary to a configuration of the primary flange 64 and being situated to receive a primary flange 64 therein (FIG. 4). Each ramp surface 52 defines a bore 72 adjacent its first side edge 56 and aligned to communicate with the primary slot 70. Of course the first end wall 60 may also define additional slots 74 to receive additional flanges 68. Therefore, when the flanges of one base member are inserted into corresponding slots of an adjacent base member, a fastener 76 such as a bolt may be inserted through a respective bore 72 and flange hole 66 so as to releasably secure the ramps together. A plug 78 may be inserted into the bore 72 to hide the fastener 76. The ramp surfaces will then be in alignment to form a substantially continuous ramp surface.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A ramp for placement adjacent a curb of a type having wall that is inclined substantially less than 90 degrees extending between a driveway and a street for allowing wheeled vehicles to traverse said curb smoothly, said ramp comprising:

an elongate planar ramp surface for enabling movement of wheeled vehicles thereon, said ramp surface having longitudinally extending upper and lower edges, a curb contact surface integrally connected to an underside of said ramp surface adjacent said upper edge and extending longitudinally therealong, said curb contact surface having a configuration complementary to a configuration of said inclined wall of said curb for bearing against said inclined wall;

a street contact surface integrally connected to said underside of said ramp surface adjacent said lower edge and extending longitudinally therealong, said street contact surface having a planar configuration for resting upon said street, said curb contact surface being inclined at an angle less than 90 degrees relative to said street contact surface;

a support member integrally connected to said underside of said ramp surface intermediate said curb contact and street contact surfaces and extending longitudinally therealong, said support member having a configuration substantially similar to a configuration of a junction between said inclined wall of said curb and said street;

wherein said support member is spaced apart from said street contact surface so as to define a drainage channel therebetween;

wherein said underside of said ramp surface defines:

an upper channel extending longitudinally therealong between said curb contact surface and said support member; and a lower channel extending longitudinally therealong between said street contact surface and said support member;

wherein said ramp surface, said curb contact surface, said street contact surface, and said support member are constructed to include a predetermined amount of carbon fiber to increase the weight thereof;

wherein said ramp surface, said curb contact surface, said street contact surface, and said support member are constructed of polyurethane structural foam adapted to remain rigid in response to a application of a load force thereon; and wherein said support member includes a tip having a generally V-shaped configuration, said tip having one tip surface parallel to said street contact surface and another tip surface parallel to said curb contact surface for nesting at said junction between said inclined wall and said street, whereby to support said ramp surface.

2. The ramp as in claim 1 wherein:

said ramp surface, said curb contact surface, said street contact surface, and said support member are constructed of ABS plastic adapted to flex in response to application of a load force thereon; and said upper and lower channels include concave configurations that enable said underside of said ramp surface to flatten out upon said load force on said ramp surface.

3. The ramp as in claim 1 further comprises a plurality of raised treads on said ramp surface for enhancing the grip of wheels traversing said ramp surface.

* * * * *